UNITED STATES PATENT OFFICE.

JULIUS R. FRANZEN, OF PORTLAND, OREGON.

ARTICLE OF FOOD OR CONFECTION.

1,368,984. Specification of Letters Patent. Patented Feb. 15, 1921.

No Drawing. Application filed September 4, 1919. Serial No. 321,728.

*To all whom it may concern:*

Be it known that I, JULIUS R. FRANZEN, a citizen of the United States, and a resident of Portland, county of Multnomah, and State of Oregon, have invented a new and useful Article of Food or Confection, of which the following is a specification.

The object of my invention is to produce a new article of food in the form of confection which shall be nutritious, palatable and healthful.

The ingredients which I use are, cocoa nut butter ¼ to ¾ pound, the former in cool, the latter in warm weather, commercial sweet chocolate 1 pound.

These materials are melted together and the resultant product is allowed to cool; and the mass is then beaten up thoroughly with some convenient implement until it acquires a creamy consistency. Then the mass may be poured into a mold for dividing into a plurality of smaller pieces, or for otherwise sub-dividing and then allowed to set. Finally the pieces so produced are each dipped into commercial milk chocolate for giving the same a finishing coating, thereby preventing the confection from being sticky or greasy to the touch. Such final dipping is also necessary to protect my confection from the atmosphere, and for keeping in good condition for a long time, which, of course, is necessary in order to be able to ship my confection for sale in the market at distant places and under varying climatic conditions.

It is to be noted that cocoa nut butter is a different article than cocoa butter; the former being made from the cocoa nut, and the latter from the cocoa bean. And cocoa butter can not be substituted for cocoa nut butter because cocoa butter will not beat up into a creamy mass as will cocoa nut butter; and besides cocoa butter has a binding action on the bowels.

By the use of cocoa nut butter, the chocolate is rendered more wholesome in my opinion.

The confection so produced has a delicious flavor and taste.

I claim:

1. A confection consisting of cocoa nut butter and commercial sweet chocolate, approximately in the proportions stated, the ingredients being melted together, then cooled and finally beaten into a creamy consistency.

2. A confection consisting of cocoa nut butter and commercial sweet chocolate approximately in the proportions stated, the ingredients being melted together, then cooled, then beaten into a creamy consistency and finally being dipped in commercial milk chocolate, thereby giving the confection a protecting coating for the purpose described.

JULIUS R. FRANZEN.